Sept. 4, 1956  S. H. POTTER ET AL  2,761,956
AUTOMATIC ELECTRIC WELDER

Filed Nov. 1, 1954  3 Sheets-Sheet 1

INVENTORS.
STEWART H. POTTER
BY JAMES M. NUDING

William R. Lane
ATTORNEY

Sept. 4, 1956  S. H. POTTER ET AL  2,761,956
AUTOMATIC ELECTRIC WELDER
Filed Nov. 1, 1954  3 Sheets-Sheet 2

INVENTORS.
STEWART H. POTTER
JAMES M. NUDING
BY
William R. Lane
ATTORNEY

INVENTORS.
STEWART H. POTTER
JAMES M. NUDING
BY

William R. Lane
ATTORNEY

United States Patent Office 2,761,956
Patented Sept. 4, 1956

2,761,956
AUTOMATIC ELECTRIC WELDER

Stewart H. Potter, Sierra Madre, and James M. Nuding, Reseda, Calif., assignors to North American Aviation, Inc.

Application November 1, 1954, Serial No. 466,099

6 Claims. (Cl. 219—130)

This invention is directed to apparatus for providing automatic control of various welding procedures. More particularly, this invention relates to a hydraulic type servo loop for providing automatic arc length control in arc welding.

In any type of arc welding it is desirable to maintain constant the arc length between the electrode and the workpiece to insure reliable welds. Heretofore, in alternating current welding, control has been provided by means to sense all or part of the alternating current wave and to start two opposing motors driving a rack and pinion to move the welding head up and down. In the prior art devices, the welding head can only be mounted in a vertical position, and the head assembly cannot be separated from the actuating devices. Furthermore, it is impossible to use any of the prior art devices as hand-welding units or as remote control units.

The present invention may generally be described as an arc welding system incorporating a hydraulic means for controlling the position of the electrode with respect to the workpiece. The hydraulic means is responsive to a mechanical signal from a transducer means which, in turn, is actuated by a signal from a voltage error sensing circuit. The arc voltage between the electrode and the workpiece is measured and compared with a preset reference voltage and the error, if any, is amplified and fed to a hydraulic actuator or transducer. This transducer controls the hydraulic system which provides compensating movement of the electrode to insure constant arc length. The invention provides a unit which is adapted for use in hand welding, remote welding, as well an in large automatic welding jigs. The use of a hydraulic system for the control of the electrode provides a linkage which will not be affected by elevated or depressed temperatures, magnetic fields, electrical disturbances, or high or low radioactive fluxes. Furthermore, this hydraulic type linkage will operate in any position, unaffected by gravity, moisture or gases.

An object of this invention is to provide an automatic welding apparatus having automatic arc length control.

A further object of this invention is to provide an automatic welding apparatus having hydraulic control of the electrode.

A still further object of this invention is to provide a means for remotely adjusting a welding head electrode.

An additional object of this invention is to provide a hydraulic-type bellows arrangement for controlling the arc length in a welding apparatus.

A further object of this invention is to provide a welding head particularly adapted for hand welding, remote welding, and automatic machine welding.

A still further object of this invention is to provide a welding apparatus in which the arc can be started and controlled automatically.

An additional object of this invention is to provide a remotely operated welding head providing constant arc length.

The above objects, as well as other objects of this invention, will be apparent from the accompanying drawings and description thereof, in which—

Figure 6:
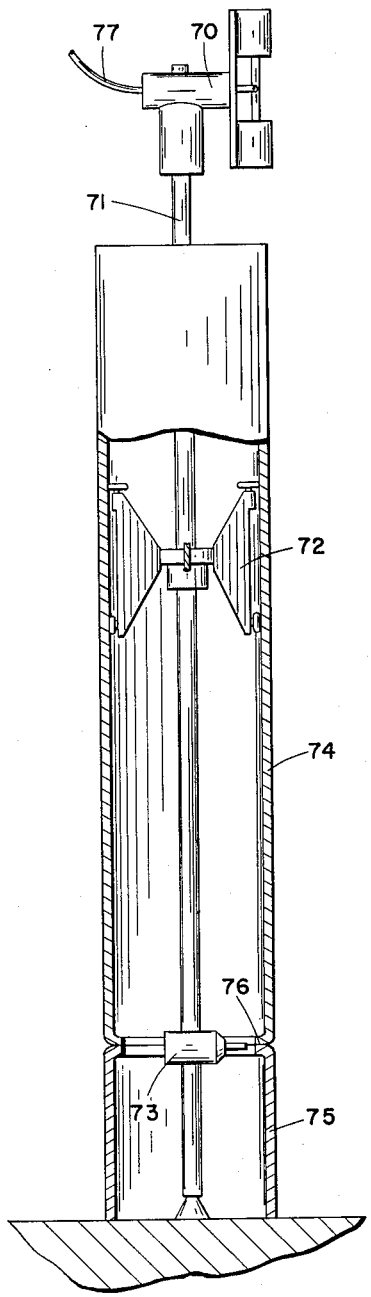

And Fig. 6 is an illustration of the instant invention used in a remote welding application.

Figure 1:
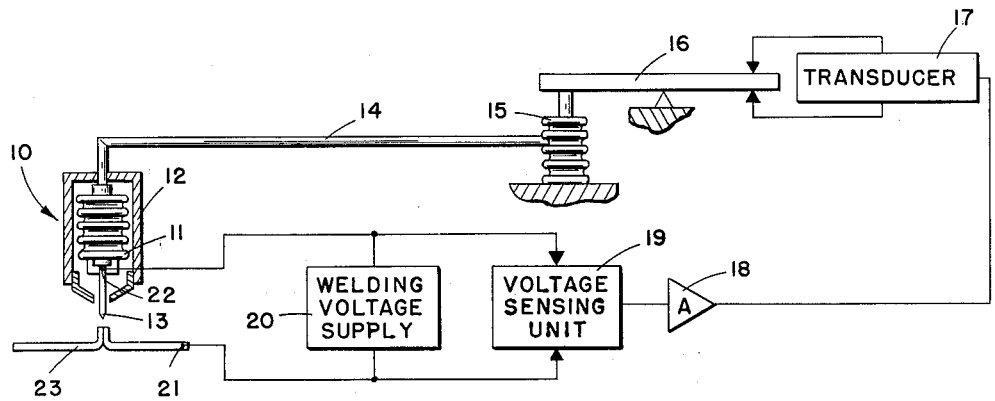
Fig. 1 shows a simplified schematic welding apparatus embodying the instant invention.

The schematically shown apparatus of Fig. 1 comprises a welding head 10 having a bellows 11 and attached electrode 13 within a shell portion 12, a hydraulic line 14 connecting the head 10 to a master hydraulic bellows 15 exteriorly of the head 10, voltage sensing means to sense the voltage between the electrode 13 and a workpiece 23, and transducer means responsive to said voltage sensing means to operate said master hydraulic bellows 15. The voltage sensing means comprises the voltage sensing points 21 and 22 on the workpiece and electrode respectively, a voltage sensing unit 19, and an amplifying unit 18. The signal from the amplifier 18 and voltage sensing unit 19 is changed from electrical energy to mechanical energy in the transducer 17 which mechanically actuates the hydraulic unit through a mechanical linkage 16. A conventional welding voltage supply 20 is provided across the leads leading to the contact points 21 and 22. In operation the voltage sensing unit 19 senses a difference between the arc voltage between points 22 and 21 and a preset desired voltage. The amplifier 18 amplifies any "error" signal and the transducer 17 moves linkage 16 which in turn moves bellows 15. Hydraulic fluid is present in the interior of the bellows 15 and 11, as well as the line 14. A change in dimension of bellows 15 is communicated through the line 14 to correspondingly decrease or increase the bellows 11. The electrode 13 is attached to the bottom portion of the bellows 11 and moves with that bellows. A hydraulic means is thus provided for moving the electrode 13 in response to changes in electrical signals communicated through the voltage sensing means and fed into the hydraulic actuating means.

Figure 2:
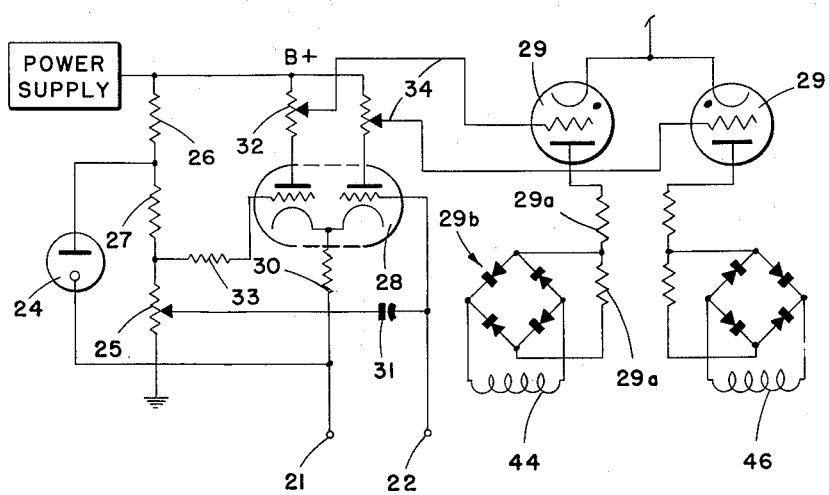
Fig. 2 is a wiring diagram of a typical voltage sensing device.

Fig. 2 shows a typical circuit for detecting and amplifying any voltage difference between the arc voltage (indicating arc length) and a reference voltage (indicating desired arc voltage). It is to be understood that other circuit means may be used to detect and amplify this error signal. For example, a common balanced bridge circuit and separate amplifier may also be employed.

As illustrated, the difference amplifier circuit senses and amplifies any difference in arc voltage across the workpiece at 21 (grounded) and the welding electrode at 22. The B+ voltage for the plates of tube 28 and the reference voltage are supplied by a common power supply of conventional construction. The resistor 26 drops the B+ voltage to a value controlled by the voltage regulator tube 24. The resistors 27, 33 and 25, the latter of the variable type to allow setting of a desired reference voltage, provide a reference voltage to one of the grids of tube 28. Resistors of the potentiometer type 32 are plate resistors for tube 28 while the cathode resistor is resistor 30. Capacitor 31 functions as a by-pass capacitor to smooth out or filter the non-reference grid voltage. Leads 34 connect each plate of tube 28 to the grids of two thyratron tubes 29. These thyratrons when fired actuate the soleniods 44 and 46 or other electro-mechanical device of the transducer 17 to mechanically actuate the electrode-controlling hydraulic system 15, 14 and 10. As shown, the signal from the thyratrons to the solenoids pass through the plate resistors 29a and the diode bridge demodulator 29b.

Figure 3:
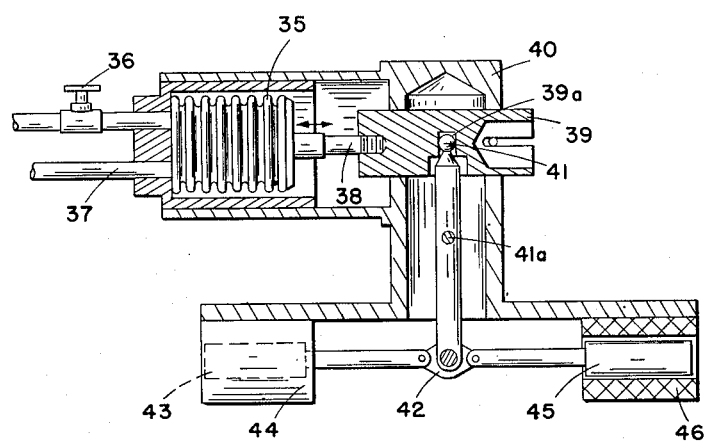
Fig. 3 is a typical hydraulic actuating device.

With the proper arc length, the welding voltage across points 21 and 22 will be balanced by the preset arc voltage control 25, and the two grids of tube 28 therefore balanced. This results in both thyratron tubes conducting an equal amount of current causing both solenoids (as seen in Fig. 3) to energize equally. No movement is transmitted to the hydraulic system and there is no movement of the electrode.

If the welding voltage should change, because of a change in arc length, the potential on the two grids of tube 28 will become unequal. This will cause the grid of one thyratron to become more negative and the other grid more positive. One solenoid will be actuated and the other released. This movement is transmitted through the linkage 16 to the hydraulic system 15, 14 and 19 to move the electrode and thus change the arc length and arc voltage. This movement continues until the sensed voltage across points 21 and 22 is equal to the preset voltage in voltage control 25. Any change in the arc voltage as dictated by the arc length is instantly corrected for by the action of the difference amplifier and the hydraulic control.

The instantly disclosed welding loop further permits automatic arc starting. When the welding machine 20 (Fig. 1) is turned "on," an open circuit arc voltage is placed across the points 21 and 22 and that open circuit voltage is applied to the difference amplifier. The difference amplifier senses the difference between the open circuit voltage and the preset voltage, energizes the solenoid and hydraulic system until the electrode 13 comes into contact with the workpiece 23 striking the arc. When the electrode becomes shorted to the workpiece the arc voltage instantly drops, energizing the other solenoid through the medium of the difference amplifier and the thyratrons. The electrode is thus retracted until both thyratrons conduct equally and the voltage across the points 21 and 22 is equal to the preset arc voltage of 25, thus giving constant arc length.

Fig. 3 illustrates a typical linkage to convert the voltage error signal to a mechanical motion and thence into the hydraulic system. This part of the welding apparatus comprises a bellows 35 having a fill port 36 and a line 37 leading to the slave bellows in the actual welding head, a connecting rod 38 and a plunger 39 situated within a housing 40. An actuator 41, pivoted at point 41a, has one end fitting in a groove 39a in plunger 39 and the other end connected to a link 42. The link 42 is connected on either side to the cores 43 and 45 of two solenoids 44 and 46. It can be seen that when either or both of solenoids 44 and 46 are actuated by the electrical voltage error signal coming from the difference amplifier or from the separate amplifier 18, that either or both the solenoid core elements 43 and 45 move link 42 pivoting the actuator 41 at 41a. The action of the head of the actuator 41 within the groove 39a in plunger 39 gives a translational movement to the connecting rod 38 moving the bellows 35 in an inward or outward direction as indicated. The movement of the master bellows 35 is communicated to the slave bellows (Fig. 1, for example) in the remote welding head through hydraulic line 37. It is readily apparent that other types of linkages will be usable in linking the transducer to the hydraulic system. The relative sizes of the master bellows 35 and the slave bellows shown in Fig. 1, for example, may be varied to give various mechanical advantages to the over-all system.

Figure 4:
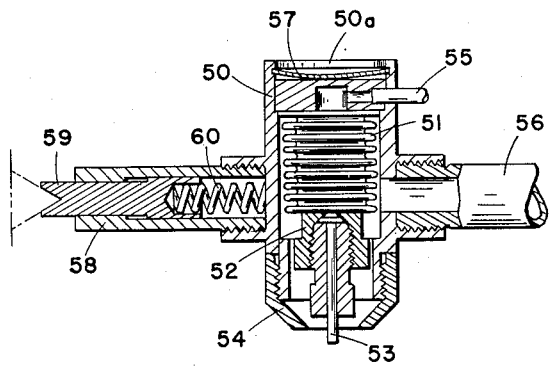
Fig. 4 is a welding head embodying the instant invention.

Fig. 4 shows a typical welding head usable in the instant welding apparatus. The welding head comprises a shell portion 50, a slave bellows 51, a collet 52 for holding an electrode 53 and a lava-type torch tip 54 depending from the shell 50. A line 55 connects the interior of the bellows 51 with the master bellows (Fig. 1, for example) at a point remote from the welding head while a tube 56 serves as a power conduit as well as a conduit for inert gas. Incorporated on the welding head of Fig. 4 is a positioning device comprising a positioning sleeve 58, a positioning plunger 59 and a positioning spring 60. This removable positioning device may be used to position the welding head during a welding procedure. A retaining spring 57 and a shell cover 50a complete the welding head construction.

Figure 5:
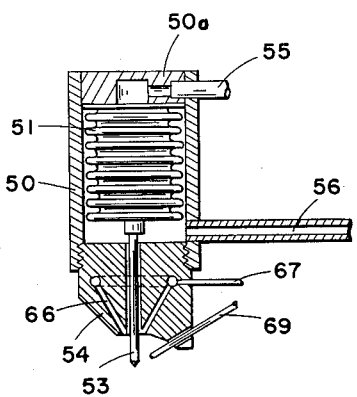
Fig. 5 is a modified type of welding head.

Fig. 5 shows a further modification of the welding head. In Fig. 5 inert gas inflow channels 66 are provided leading from an inert gas inflow at 67. In addition, provision is made for an automatic weld rod feed device 69. When manual operation of the welding head is desired, flexible tubing may be used to connect the welding head to the remainder of the apparatus. It is readily apparent that a relatively unskilled welder will be able to make highly acceptable welds due to the automatic control of the arc length distance. The simplified construction of the welding head used in the welding apparatus is such that the welding head would occupy a volume of about 2 cubic inches. By reason of this small size the instant welding head is particularly adapted for welding in remote areas and for hand welding. Larger models, of course, would ordinarily be used in automatic machine welding. The welding heads illustrated in Figs. 4 and 5 may be further modified by providing cooling jackets there-around when welding procedures involving more than approximately 120 amps. are contemplated.

Fig. 6 shows a specific adaptation of the apparatus adapted for remote welding. As illustrated, the remote welding device is positioned to weld abutting flanges 76 of pipes 74 and 75. The mechanism includes a combined means 70 including the torch drive gear, master bellows, solenoids, and solenoid actuating means. The welding head 73 is shown extending from the means 70 upon a rod 71. The rod 71 encases the power supply to the welding head, the hydraulic line from the master bellows to the slave bellows within the welding head and the inert gas supply. In certain applications, guiding means 72 may be provided on the depending rod 71 to guide movement of the welding head during its operative procedure. By use of the instant welding apparatus, the arc may be automatically struck within the tube and a constant arc length provided regardless of the fact that the pipes 74 and 75 are in or out of round. The welding head illustrated in Fig. 6 may be positioned within the casing by a number of varying means, including a conventional cam follower arrangement, mere numerical control of the depth of the rod 71 or by a pantagraph arrangement. The rod 71 may, in certain applications, be of various and varying angularity. Furthermore, various optical instruments may be provided for visual control of the welding head in hidden, internal, and remote places. The positioning device illustrated in Fig. 4 may be used in conjunction with the remote control head illustrated in Fig. 6. This positioning means will act as a floating center to assure concentric rotation of the torch when joining or repairing pipes as illustrated in Fig. 6.

Although the invention has been described and illustrated in detail, it is to be clearly understood that the same is by way of illustration and example only and is not to be taken by way of limitation, the spirit and scope of this invention being limited only by the terms of the appended claims.

We claim:

1. An apparatus for electric arc seam welding comprising an electrode, a welding circuit to maintain a welding arc, voltage sensing means to sense the arc voltage between the electrode and a workpiece, a push-pull electromagnet remote from said electrode, a mechanical linkage connected thereto, and hydraulic means including a first bellows connected to said linkage and a second bellows connected to said electrode, said hydraulic means being adapted to move said electrode so as to maintain an essentially constant arc length between said electrode and said workpiece as said electrode is moved laterally with respect to said workpiece.

2. An apparatus for electric arc seam welding comprising an electrode, a welding circuit to maintain a welding arc, voltage sensing means to sense the arc voltage between the electrode and a workpiece, a pair of push-pull electromagnets remote from said electrode and responsive to error signals from said sensing means, a mechanical linkage connected thereto, and hydraulic means including a first bellows connected to said linkage and a second bellows connected to said electrode, said hydraulic means being adapted to move said electrode so as to maintain an essentially constant arc length between said electrode and said workpiece as said electrode is moved laterally with respect to said workpiece.

3. An apparatus for electric arc welding comprising an electrode, a welding circuit to maintain a welding arc, voltage sensing means to sense the arc voltage between the electrode and a workpiece, first and second electromagnetic cores responsive to error signals on said voltage sensing means, a connecting link between said cores, a first-order lever having one end connected to said link, the other end of said lever being adapted to move a first hydraulic bellows, a second hydraulic bellows remote from said first bellows, and hydraulic line means interconnecting the interiors of said bellows, said electrode being connected to said second bellows whereby movement of said first bellows by said lever moves said electrode.

4. Means for remotely adjusting a welding head electrode operatively spaced from a workpiece and adapted for lateral movement with respect to the workpiece to form seam welds comprising a master bellows remote from said electrode and adapted to be moved by a mechanical signal in proportion to the spacing between said workpiece and said electrode, a slave bellows connected to said electrode and moveable therewith, and a hydraulic line between said bellows to communicate movement of said master bellows to said slave bellows and to keep the spacing between said workpiece and said electrode constant.

5. The invention as set out in claim 4 in which the slave bellows is surrounded by a welding head casing and one end of the slave bellows is held immobile in said casing.

6. A welding head for remote arc welding comprising a casing adapted for relative lateral movement with a workpiece, an operating bellows having one end fixed within said casing, means adapted to hydraulically expand and contract said bellows, an electrode holding means attached to a movable end of said bellows, and a welding electrode extending from said casing and held in said holding means, whereby the electrode is adapted to move in unison with said bellows in spaced relation to said workpiece.

References Cited in the file of this patent

UNITED STATES PATENTS

| | | |
|---|---|---|
| 294,455 | Earle et al. | Mar. 4, 1884 |
| 2,063,258 | Martin | Dec. 8, 1936 |
| 2,126,490 | Martin | Aug. 9, 1938 |
| 2,496,104 | Paner | Jan. 31, 1950 |